UNITED STATES PATENT OFFICE.

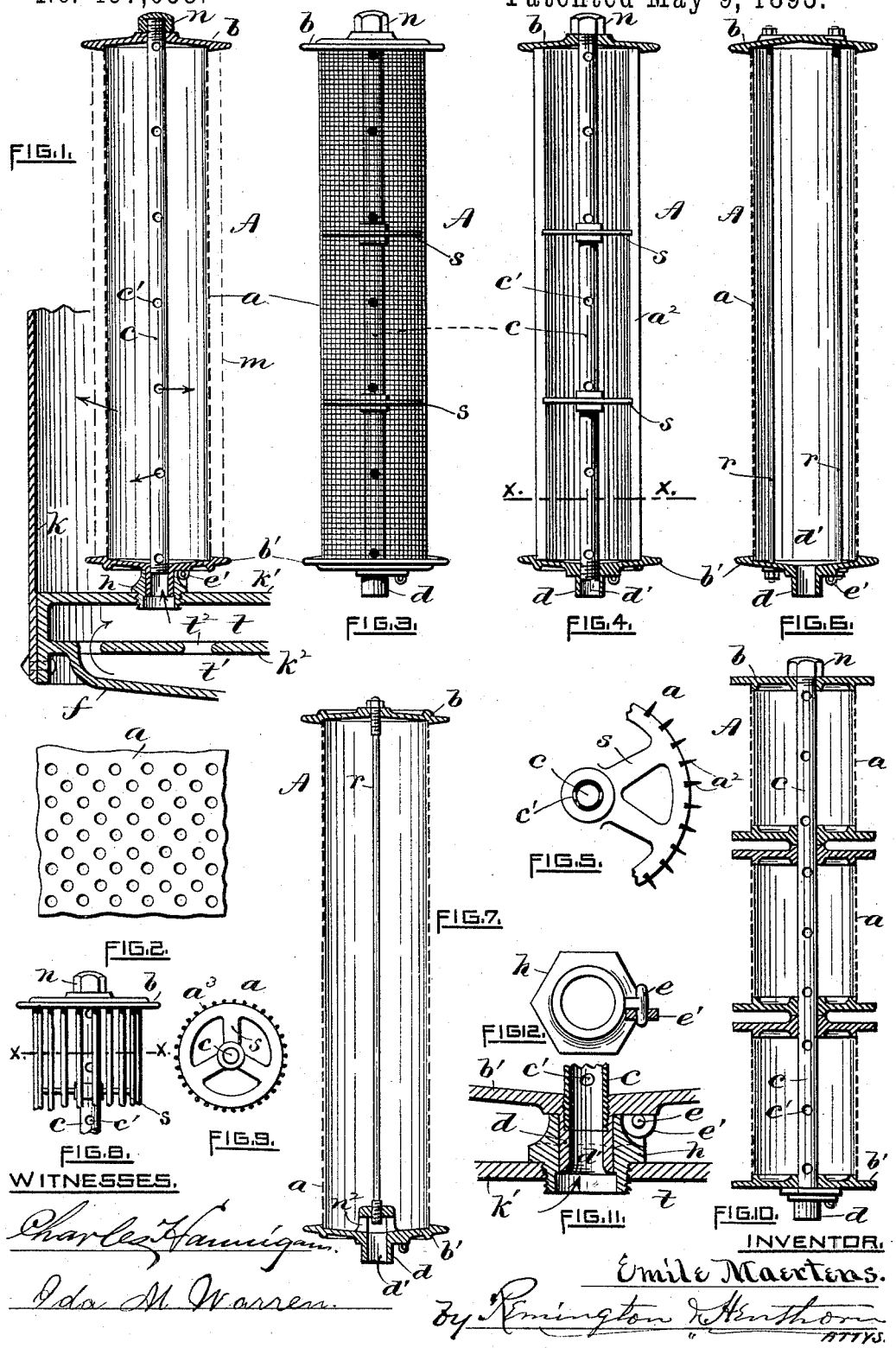

EMILE MAERTENS, OF PROVIDENCE, RHODE ISLAND.

SPOOL FOR DYE-VATS.

SPECIFICATION forming part of Letters Patent No. 497,053, dated May 9, 1893.

Application filed February 1, 1892. Serial No. 419,877. (No model.)

*To all whom it may concern:*

Be it known that I, EMILE MAERTENS, a citizen of the United States, residing at Providence, in the county of Providence and State of Rhode Island, have invented certain new and useful Improvements in Spools or Holders for Apparatus for Treating Fibrous Materials; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In an application for United States Letters Patent, Serial No. 419,439, filed January 27, 1892, I have described and claimed an apparatus for chemically treating fibrous materials, the latter being mounted on perforated spools or holders through which the treating-liquids circulate.

My present invention also relates to apparatus for treating fibrous materials, but more especially to the novel construction of the holders on which the material to be treated is mounted; and it consists, essentially, of a holder having a closed top head, an open bottom head through which the treating-liquor circulates and arranged to communicate with the kier-chamber, and an apertured or perforated barrel portion inclosed between said heads on which the material to be treated is wound or wrapped, all as will be more fully hereinafter set forth and claimed.

In the accompanying sheet of drawings, Figure 1 is a vertical central sectional view, showing my improved holder as mounted in a treating-kier, only a portion of the latter being represented. Fig. 2 shows a portion of the barrel surface of the holder, as provided with a series of fine holes or perforations. Fig. 3 is a side elevation of the holder, showing the barrel portion as made of wire netting.
Fig. 4 is a longitudinal sectional view, showing the holder formed of a series of narrow slats or bars. Fig. 5 is an enlarged sectional view, taken on line $x\,x$ of Fig. 4. Fig. 6 is a longitudinal central sectional view, showing the heads connected by a series of ties. Fig. 7 is a similar view, having the heads united by a central tie. Fig. 8 shows the upper part of a holder, having the barrel portion formed of a series of small round rods, arranged longitudinally of the holder. Fig. 9 is a transverse sectional view, taken on line $x\,x$ of Fig. 8. Fig. 10 is a sectional view, showing the holder as composed of three shorter ones mounted on a common center, or perforated tube. Fig. 11 is an enlarged sectional view, showing a manner of mounting the holder within a kier and securing it in position, and Fig. 12 is a plan view of the socket itself, as adapted to receive the lower end of the holder.

A, in the drawings indicates my improved spool or holder as a whole.

The top heads are indicated by $b$ and the bottom heads by $b'$. These heads or ends form flanges and are arranged to receive the corresponding ends of the barrel or material-holding portion $a$. The barrel may be formed of sheet metal perforated with small holes, as in Fig. 2; or it may be made of wire netting, as indicated in Fig. 3, and supported laterally by spiders $s$.

In Figs. 4 and 5, the material-carrying surface or barrel $a$ consists of a series of longitudinal wings $a^2$ separated from each other laterally. A similar arrangement is represented in Figs. 8 and 9, wherein the barrel $a$ is formed of round rods $a^3$, supported laterally by spiders $s$. In any event the barrel $a$ is so constructed that when in use the treating-liquors pass freely through it. The top heads $b$ are closed and the bottom ones are open, or arranged to communicate with a chamber $t$ formed in the base $f$ of the treating-kier $k$, see Fig. 1. As drawn the bottom head is provided with a tubular extension or nozzle $d$, the same fitting the bore of the socket $h$ screwed into the upper wall $k'$ of the kier-base, see also Fig. 11. The bottom head is further provided with an eye $e'$ arranged to receive an end of the T-shaped pin $e$ formed on the outside of the socket.

The heads of the spools are adapted to receive the ends of the barrel, the whole then being secured together by one or more screw-threaded longitudinal ties $r$, as shown in Figs. 6 and 7. In lieu of this arrangement a perforated tube $c$ may be employed, which is screwed into the bottom head and passes through the top head; a cap-nut $n$ serving to clamp the parts together.

The manner of using my improved holder A is as follows:—The material to be treated, in the form of sliver, yarn, &c., as the case may be, is first thinly wound or wrapped around the barrel $a$ (the dotted line $m$ Fig. 1 indicates a filled holder), after which the material-carrying holder is mounted say in a socket $h$ screwed into the kier-base, and locked in place by turning the holder axially until the eye $e'$ thereof engages the corresponding end of the pin $e$. The treating-liquor under suitable pressure first enters the space or channel $t'$ of the kier-base, thence upwardly through openings $t^2$ into the chamber $t$ and from the latter it rises through the socket and nozzle $d$ into the tube $c$, thence through the series of tube-openings $c'$ into and filling the holder-chamber, and from the latter the liquor passes outwardly through the several openings or perforations formed in the barrel portion and through the load or material mounted thereon; see arrow-direction Fig. 1. If desired the direction of the treating-liquid may be reversed, in which case it first passes through the material and holder and next into the kier-base. In some cases the circulation is intermittingly continued in reverse directions. I would add that practically I prefer that the filled spools after being mounted within the kier of the apparatus be submerged in the treating-liquor before the forced circulation is commenced. After the material has been sufficiently treated and dried the holders are removed from the kier and the thus-treated load unwound onto bobbins, &c., and finally finished in any well-known manner.

I claim as my invention—

1. A spool or holder consisting of the flanges $b, b'$, a central perforated tube, an outer inclosing perforated barrel held by the flanges, and sustaining spiders $s$, secured to the inner tube, substantially as described.

2. A spool or holder consisting of the flanges $b\ b'$, the perforated barrel held between the flanges, a central support, a tubular extension $d$ on the lower flange, a socket $h$ adapted to receive the extension $d$, an eye $e'$ on the lower face of the lower flange and a pin $e$ on the socket engaging the eye to lock the spool in place, substantially as described.

In testimony whereof I have affixed my signature in presence of two witnesses.

EMILE MAERTENS.

Witnesses:
GEO. H. REMINGTON,
CHARLES HANNIGAN.